United States Patent
Heywood-Lonsdale et al.

(10) Patent No.: US 10,152,812 B2
(45) Date of Patent: Dec. 11, 2018

(54) ODD-EVEN VEIL VIEW FOR FFS

(71) Applicant: Sharp Kabushiki Kaisha, Osaka (JP)

(72) Inventors: Edward Heywood-Lonsdale, Oxford (GB); Benjamin John Broughton, Oxford (GB); Nathan James Smith, Oxford (GB); Kenji Maeda, Osaka (JP); Fumitaka Seki, Osaka (JP); Paul Antony Gass, Oxford (GB)

(73) Assignee: SHARP KABUSHIKI KAISHA, Osaka (JP)

( * ) Notice: Subject to any disclaimer, the term of this patent is extended or adjusted under 35 U.S.C. 154(b) by 227 days.

(21) Appl. No.: 14/921,694

(22) Filed: Oct. 23, 2015

(65) Prior Publication Data
US 2017/0116766 A1    Apr. 27, 2017

(51) Int. Cl.
*G02F 1/1343* (2006.01)
*G06T 11/60* (2006.01)
(Continued)

(52) U.S. Cl.
CPC ........ *G06T 11/60* (2013.01); *G02F 1/134309* (2013.01); *G06T 3/40* (2013.01);
(Continued)

(58) Field of Classification Search
CPC .................. G02F 2001/134372; G09G 3/3688
See application file for complete search history.

(56) References Cited

U.S. PATENT DOCUMENTS

| | | |
|---|---|---|
| 5,793,344 A | 8/1998 | Koyama |
| 8,368,727 B2 | 2/2013 | Smith et al. |

(Continued)

FOREIGN PATENT DOCUMENTS

| | | |
|---|---|---|
| GB | 2428152 A1 | 1/2007 |
| JP | 2009-222943 A | 10/2009 |

(Continued)

OTHER PUBLICATIONS

Ilias Pappas, Stylianos Siskos and Charalambos A. Dimitriadis (2009). Active-Matrix Liquid Crystal Displays—Operation, Electronics and Analog Circuits Design, New Developments in Liquid Crystals, Georgiy V Tkachenko (Ed.), ISBN: 978-953-307-015-5, InTech, DOI: 10.5772/9686.

*Primary Examiner* — Matthew Salvucci
(74) *Attorney, Agent, or Firm* — Renner Otto Boisselle and Sklar

(57) ABSTRACT

A display device includes control electronics and a pixellated liquid crystal (LC) panel. The control electronics receives inputs of main image data for a main image and side image data for a side image. The control electronics outputs combined image data combining the main and side images such that an on-axis viewer perceives from the combined image the main image, and an off-axis viewer perceives from the combined image the side image. The output image data comprises data values chosen from a set of available output data values for the pixels selected from multiple sets of available data values depending on at least on the side image data. For a pixel currently being processed, the output data value is chosen from the selected set of available output data values for which a resulting luminance value is closest to a target luminance value for the current pixel.

20 Claims, 10 Drawing Sheets

(51) Int. Cl.
  *G06T 3/40*   (2006.01)
  *G06T 5/00*   (2006.01)
  *G06T 5/50*   (2006.01)
  *G09G 3/36*   (2006.01)
  *G02F 1/1362* (2006.01)

(52) U.S. Cl.
  CPC ............... *G06T 5/002* (2013.01); *G06T 5/50* (2013.01); *G09G 3/3648* (2013.01); *G02F 1/1362* (2013.01); *G02F 2001/134372* (2013.01); *G09G 2300/0434* (2013.01); *G09G 2300/0447* (2013.01); *G09G 2320/068* (2013.01); *G09G 2358/00* (2013.01)

(56) References Cited

U.S. PATENT DOCUMENTS

2011/0175936 A1    7/2011  Smith et al.
2014/0210878 A1*   7/2014  Broughton ............. G09G 3/003
                                                    345/694

FOREIGN PATENT DOCUMENTS

| WO | WO 2009110128 A1 | 9/2009 |
| WO | WO 2011034208 | 3/2011 |
| WO | WO 2011034209 | 3/2011 |

\* cited by examiner

ODD-EVEN VEIL VIEW FOR FFS

TECHNICAL FIELD

The present invention relates to a display device, such as a Fringe Field Switching (FFS) mode active matrix liquid crystal display device, which is switchable between a public display mode and a private display mode.

BACKGROUND ART

Several types of display devices are known which are switchable between a public display mode and a private display mode, with varying degrees of additional cost over a standard display, ease of use and strength of privacy performance.

Devices incorporating such displays include, for example, mobile phones, tablet and laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in-car television screen while the car is in motion.

Image processing methods exist for producing a privacy effect in liquid crystal displays (LCDs) which, when in the private mode manipulate the image data in a manner dependent on a second, masking, image, and therefore cause that masking image to be perceived by the off-axis viewer when the modified image is displayed. Examples of such image processing methods are given in Powell et al., GB2428152A1, published on Jan. 17, 2007; Broughton et al., WO2009110128A1, published on Sep. 11, 2009; Broughton et al., WO2011034209, published on Mar. 24, 2011; and Broughton et al., WO2011034208, published on Mar. 24, 2011. These methods provide an electronically switchable public/private display with no additional optical elements required, minimal additional cost, and satisfactory privacy performance. These methods all utilise the limited resolution of the human visual system by redistributing the luminance produced to the on-axis viewer by a group of neighbouring pixels within that group while maintaining the same overall luminance produced by the group as a whole. These methods may be described as "pixel splitting". However, these image processing methods also rely on the off-axis to on-axis luminance curve being strongly non-linear, as illustrated in FIG. 2, so that pairs of pixels in which splitting has been applied produce the same on-axis luminance, but significantly different off-axis luminance to a pair of pixels in which no splitting has been applied This is not the case for some display modes, for example, in-plane switching (IPS), fringe-field switching (FFS) LC display modes and OLEDs. This is illustrated in FIG. 3 for an FFS mode LCD, which shows the difference in off-axis luminance between pairs of pixels with and without splitting applied is at best 10%. As a result, the privacy effect is not sufficiently strong in these display devices to disguise the on-axis image from an off-axis viewer.

Smith et al, U.S. Pat. No. 8,368,727 B2, published on Feb. 5, 2013, describes methods in which a switchable privacy effect can be enabled in displays of this type, having close to linear off-axis to on-axis luminance response, by engineering individual pixels within each group of pixels to have differing view angle properties, and thereby providing a stronger privacy method then achievable with the methods of WO2009110128A1. The methods described in Smith et al. suggest the use of lenticular arrays or parallax barriers to modify the inherently uniform, close to linear off-axis to on-axis luminance response of the pixels in these types of display, so as to result in two pixel types with differing view angle performance. An example pair of modified off-axis to on-axis luminance responses for the two pixel types, and the basis of the corresponding switchable privacy method of U.S. Pat. No. 8,368,727 B2 are illustrated in FIG. 4. It can be seen that in contrast to the methods of WO2009110128A1, a privacy effect is generated by contrasting regions with pixel splitting in one direction (i.e. concentrating the combined luminance of a pair of pixels into a first pixel of the pair having a first type of modified off-axis to on-axis luminance response), against regions with pixel splitting in the opposite direction (concentrating the combined luminance of a pair of pixels into the second pixel of the pair, which has a second type of modified off-axis to on-axis luminance response.

SUMMARY OF INVENTION

It is therefore desirable to provide a high quality LCD display which has public and private mode capability, in which no modification to the LC layer or pixel electrode geometry is required from a standard display, has a substantially unaltered display performance (brightness, contrast resolution, close to linear on-axis to off-axis luminance response etc) in the public mode, and in the private mode has a strong privacy effect with minimal disruption of the on-axis image quality perceived by the legitimate viewer.

The current invention provides image processing methods and display apparatuses that achieve such advantages by enhanced processing of image data in a liquid crystal display (LCD). Aspects of the invention include a display device including control electronics and a pixelated liquid crystal (LC) panel. The control electronics receives input of main image data for a main image, and side image data for a side image. The control electronics then outputs image data for a combined image of the main image and side image. In a private viewing mode, an on-axis viewer perceives from the combined image the main image and an off-axis viewer perceives from the combined image the side image.

The output image data for the combined image comprises output data values for pixels in a liquid crystal (LC) panel. The output data values for a given pixel in the image are determined by a combination of the more significant bits of the main image input data for that pixel, the corresponding side image data for that pixel, a "flag" parameter indicating which of at least two pixel types the current pixel data is intended for, and a second "flag" parameter indicating whether the current pixel is at the location of a particular boundary type in the side image. This second "flag" parameter may by calculated via analysis of the side image data as part of the image processing method, or input alongside the side image data to the process. The output data values include signal data voltages for the pixels in the LC panel.

According to one aspect of the invention, a method of processing image data for a display having a plurality of pixels includes: obtaining main image data corresponding to a main image; obtaining side image data corresponding to a side image; processing, using control electronics, the main image data and the side image data to produce combined image data, wherein said processing includes at least one of i) processing the main and side image data as a function of a type of pixel on the display, or ii) processing the main and side image data as a function of a location of each pixel relative to a boundary in the side image.

In one embodiment, processing includes processing the main and side image data using both steps i) and ii).

In one embodiment, processing the main and side image data as a function of a pixel type includes determining the pixel type as a function of a location of each pixel on the display.

In one embodiment, the method includes outputting the processed image data on the display, wherein an on-axis viewer largely perceives from the combined image the main image and an off-axis viewer largely perceives from the combined image the side image.

In one embodiment, the method includes using a first look-up table to process the main image data when in a public display mode, and using a second look-up table to process the main and side image data when in a private display mode, the second look-up table different from the first look-up table.

In one embodiment, using the first or second look-up table includes using a look-up table that takes into account a voltage-luminance characteristic of the display to provide an intended luminance at each pixel as defined by at least one of the main image data or the side image data.

In one embodiment, using the second look-up table includes using a look-up table that is dependent on both the main image and the side image.

In one embodiment, using the second look-up table includes using a look-up table that selectively concentrates a combined luminance of a plurality of pixels including at least two pixel types into one pixel type, wherein the pixel type to be used is based on the side image data.

In one embodiment, using the second look-up table includes using a look-up table that compresses a range of luminance values produced by the main image data to produce luminances that have a larger difference between off-axis luminances produced by odd rows and even rows.

In one embodiment, the method includes generating a composite input value for each pixel for entering into at least one of the first or second look-up table to retrieve the output data value.

In one embodiment, the method includes selecting the most significant bits of the main input image data, and combining the most significant bits with the composite input data value.

In one embodiment, the method includes applying a blurring filter to the main image data prior to combining the main image data with the side image data to reduce image artefacts.

In one embodiment, the method includes using a fringe-field switching-type (FFS-type) liquid crystal display (LCD) to display a combined image corresponding to the combined image data.

In one embodiment, using the FFS-type LCD includes using an FFS-type LCD that does not include additional optical components for modifying the display to enable a private mode.

In one embodiment, using the FFS-type LCD includes using an LCD in which the at least two types of pixels are pixels in alternate rows having a mirrored electrode geometry to each other.

According to another aspect of the invention, a display device includes: a display having a plurality of pixels; and control electronics operatively coupled to the display, the control electronics configured to execute the method described herein.

In one embodiment, the display comprises a fringe-field switching (FFS) type liquid crystal display (LCD) with at least two types of pixels arranged in alternate rows and having a mirrored electrode geometry to each other.

In one embodiment, the display comprises a fringe-field switching (FFS) liquid crystal display (LCD) having monodomain pixel types with pixel electrode fingers, and an orientation of each pixel electrode finger is mirrored in alternate rows.

According to another aspect of the invention, a method for generating pixel data for a display having a plurality of pixels for providing a private viewing mode with a main image and a side image, the display including pairs of pixels each pair comprising a first pixel type and a second pixel type different from the first pixel type includes: determining an on-axis data value to luminance response for the first pixel type of a pair of pixels; determining an on-axis data value to luminance response for the second pixel type of the pair of pixels; and generating, via control electronics for the display, a first data value for one pixel of the pair, and generating a second data value for the other pixel of the pair, wherein generation includes generating the respective data values to compensate for a variation of the on-axis data value to luminance response for the respective pixels of the pair of pixels.

According to another aspect of the invention, a method for generating pixel data for a display for providing a private viewing mode with a main image and a side image, the display having a plurality of pixels includes: using a lookup table (LUT) to generate an output value for each pixel of the display, wherein using the LUT includes determining, using control electronics, if the output value for each pixel which corresponds to an input value for a pixel that is adjacent to a boundary in the side image, and upon determining the output value for each pixel corresponds to an input value for a pixel that is adjacent to the boundary in the side image, scaling, via the control electronics, the output value relative to an equivalent output value for non-side image boundary pixels to account for an appearance in an output image of adjacent pixels having a same modification direction relative to input main image data.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
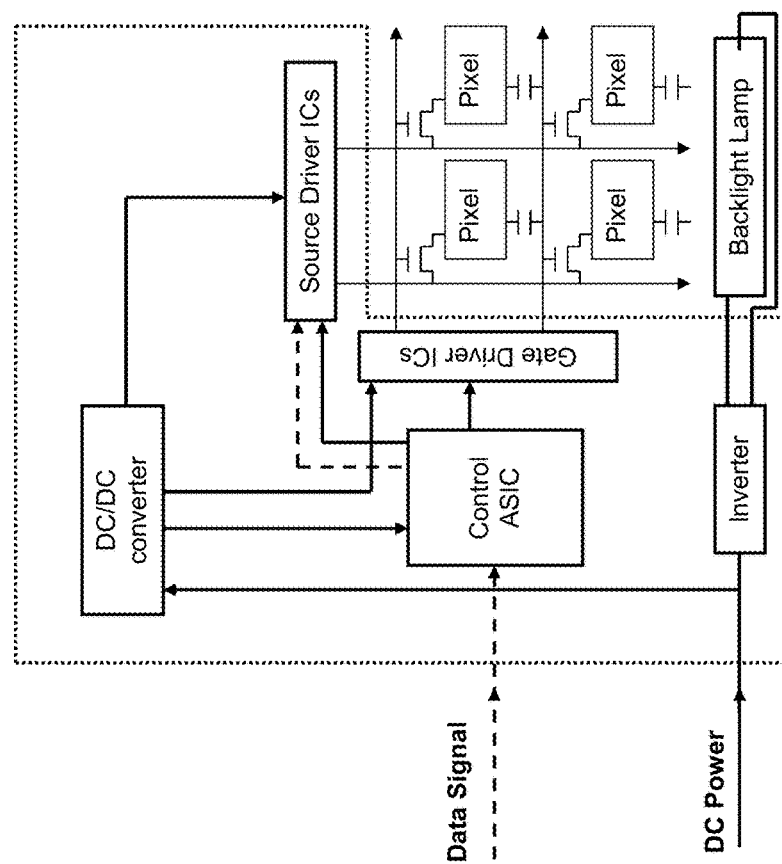
FIG. 1: is an example schematic of a standard LCD panel and associated control electronics.
Figure 2:
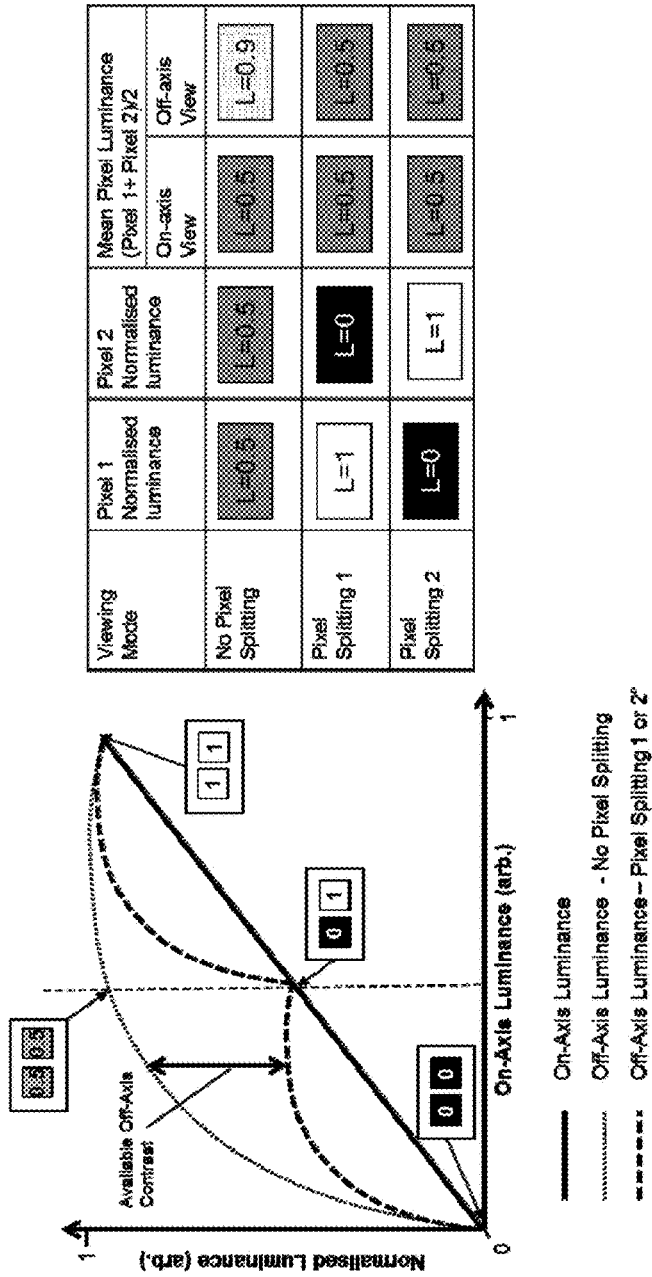
FIG. 2: is a plot of the selectable off-axis to on-axis luminance space of a vertically aligned (VA) mode display, when using an image processing method of the prior art.

1. LCD Control Electronics
2. Liquid crystal panel
3. Principal viewer
4. Angular viewing range of the main image in the public mode
5. Off-axis viewer
6. Angular viewing range of the main image in the private mode.
7. Input main image data
8. Input side image data

DETAILED DESCRIPTION OF INVENTION

In a first exemplary embodiment, a display device has a standard (single wide-viewing (public) mode only) LCD, with modified control electronics. An LCD generally has several component parts including at least in part:

1. A backlighting unit to supply even, wide angle illumination to the panel.
2. Control electronics to receive digital image data and output analogue signal voltages for each pixel, as well as timing pulses and a common voltage for the counter electrode of all pixels. A schematic of a standard layout of an LCD control electronics is shown in FIG. 1 (See (Ilias Pappas, Stylianos Siskos and Charalambos A. Dimitriadis (2009). Active-Matrix Liquid Crystal Displays—Operation, Electronics and Analog Circuits Design, New Developments in Liquid Crystals, Georgiy V Tkachenko (Ed.), ISBN: 978-953-307-015-5, InTech, DOI: 10.5772/9686)).
3. A liquid crystal (LC) panel, for displaying an image by spatial light modulation, including two opposing glass substrates, onto one of which is disposed an array of pixel electrodes and an active matrix array to direct the electronic signals, received from the control electronics, to the pixel electrodes. Onto the other substrate is usually disposed a uniform common electrode and colour filter array film. Between the glass substrates is contained a liquid crystal layer of given thickness, usually approximately 2-6 $\mu$m, which may be aligned by the presence of an alignment layer on the inner surfaces of the glass substrates. The glass substrates will generally be placed between crossed polarising films and other optical compensation films to cause the electrically induced alignment changes within each pixel region of the LC layer to produce the desired optical modulation of light from the backlight unit and ambient surroundings, and thereby generate the image.

Figure 5:
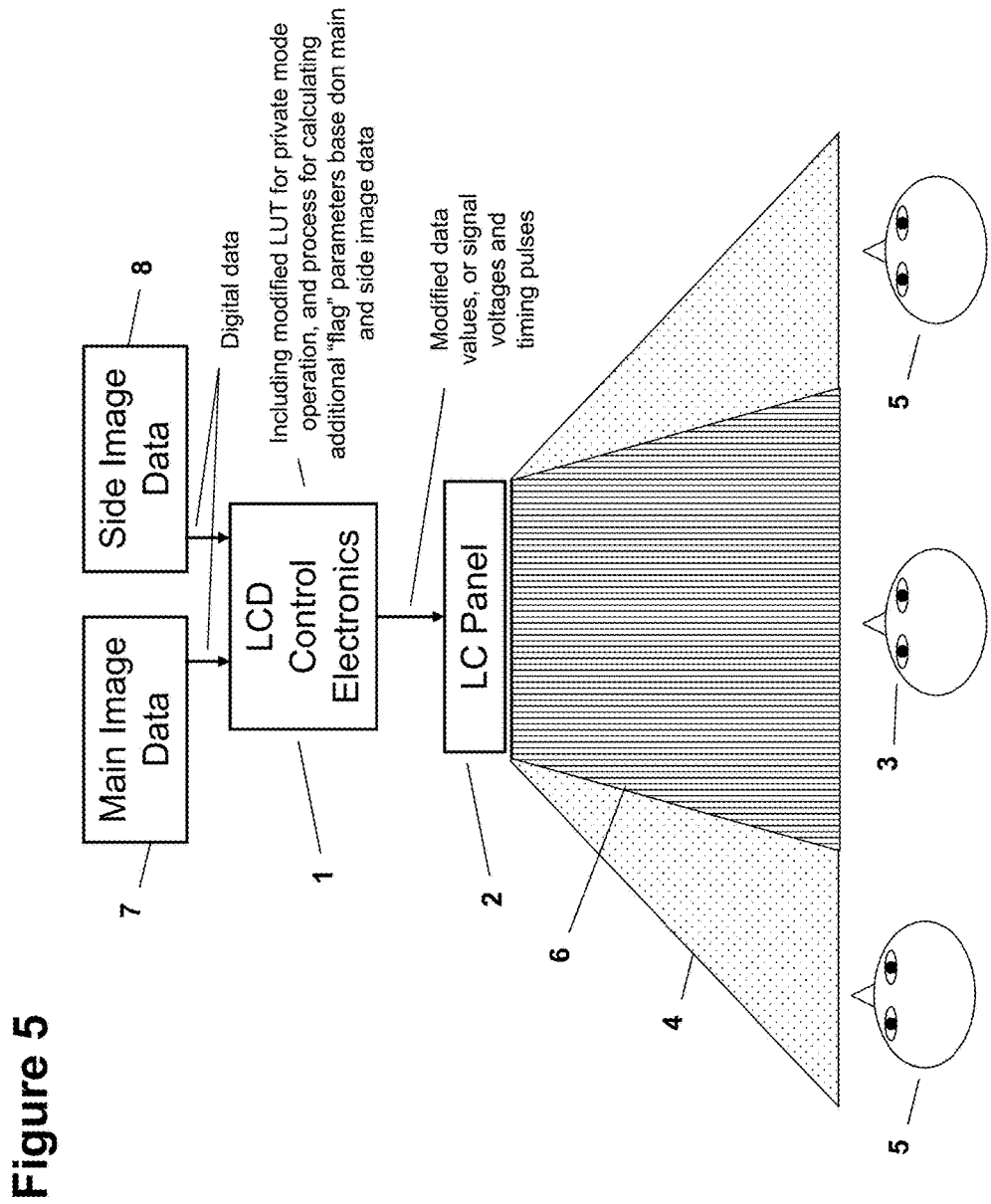
FIG. 5: is a schematic of a display with a switchable public/private viewing mode, according to an embodiment of the present invention.

An exemplary embodiment of a display device of the present invention is represented schematically in FIG. 5. Generally, the LCD Control Electronics 1 (referred to herein also as control electronics), will be configured specifically to the electro-optical characteristics of the LC panel 2, so as to output signal voltages which are dependent on the input image data in such a way as to optimise the perceived quality of the displayed image, i.e. resolution, contrast, brightness, response time etc, for the principal viewer 3, observing from a direction normal to the display surface (on-axis). The relationship between the input image data value for a given pixel and the observed luminance resulting from the display, referred to in the art as the "gamma curve", is determined by the combined effect of the data-value to signal voltage mapping of the display driver, and the signal voltage to luminance response of the LC panel. It should be noted that for the purposes of this description, a pixel refers to a region of the display having independently controllable luminance. In a typical colour display, each composite white pixel will comprise three differently coloured (usually red, green and blue) sub-pixels which, being independently controllable, would fit the description of "pixel" used herein.

The LC panel 2, will generally be configured so as to preserve the display gamma curve as closely as possible to the on-axis response for all viewing angles, thereby providing substantially the same high quality image to a wide viewing region 4. Fringe-field switching (FFS) and other In-Plane Switching (IPS) type LCDs have particularly good preservation of the on-axis image quality to a wide range of off-axis viewing directions.

When the device of this embodiment is operating in the public mode, a set of input main image data 7 constituting a single image, is input to the control electronics 1 in each frame period. The control electronics then outputs a set of digital output data values, or analogue output signal data voltages, to the LC panel 2 (in the former case, the digital output data values are converted to analogue signal voltages by electronics included in the LC panel 2). Each of these signal voltages is directed by the active matrix array of the LC panel to the corresponding pixel electrode and the resulting collective electro-optical response of the pixels in the LC layer generates the image.

The control electronics has a single mapping of input pixel data value to output pixel data or signal voltage (Look-up table, LUT), which it applies to the process for all pixels. In some cases a different look-up table may be used for the red, green and blue sub-pixels of the display, but there is no variation in the mapping of input data to output voltage based on the spatial position of the pixel data within the image, or the pixel electrode within the display. Substantially the same image is then perceived by the on-axis viewer 3 and off-axis viewers 5, and the display can be said to be operating in a wide or public viewing mode.

When the device is operating in the private mode, two image datasets are input to the control electronics 1 in every frame period: input main image data, 7 constituting a main image, and input side image data 8 constituting a side image.

The control electronics then produces an output image comprising a set of signal data voltages, one data voltage for each pixel in the LC panel as described previously. However, the control electronics (display controller) now utilises a modified LUT process, and the output data value or signal data voltage for each pixel in the LC panel, constituting a combined image, is selected from a set of available output data voltages based on one or more of:

a.) The data values for the corresponding pixel (in terms of spatial position in the image), in the main image.
b.) The data values for the corresponding pixel (in terms of spatial position in the image), in the side image.
c.) A spatial "flag" parameter indicating which of at least two pixel types the currently processed pixel belongs to. This flag may be calculated within the modified LCD control electronics, 1, using knowledge of the pixel position in the image and which pixels positions in the LC panel, 2, are of a given type, or it may be input to the electronics alongside the main image data.
d.) A second "flag" parameter indicating whether the currently processed pixel corresponds with a particular boundary type in the side image. This flag may be generated via analysis of the side image as part of the process, or it may be input to the process an addition to the side image data, as effectively a $3^{rd}$ image.

In this way, the standard LCD control electronics are modified to receive, and store in a buffer, at least two images, rather than one image, per frame period, and also to select a single output data or signal voltage per pixel from a set of available output values which is dependent to some extent on at least the second (side) image data set.

The output voltage from the control electronics 1 then causes the LC panel 2 to display a combined image which is perceived as the main image when observed by the main viewer 3, and simultaneously, due to the different gamma curve characteristic of the LC panel for the off-axis viewers 5, is perceived as the side image most prominently by these off-axis viewers 5. The perceived side image obscures and/or degrades the main image, securing the main image information to viewers within a restricted cone of angles 6 centred on the display normal. In practice, it may be the case that the on-axis viewer 6 sees a blend of the two images but is able to usefully perceive the original main image; the off-axis viewers 5 will also see a blend of the two images but will predominantly see the side image, such that they are unable to usefully observe the contents of the main image.

Figure 3:
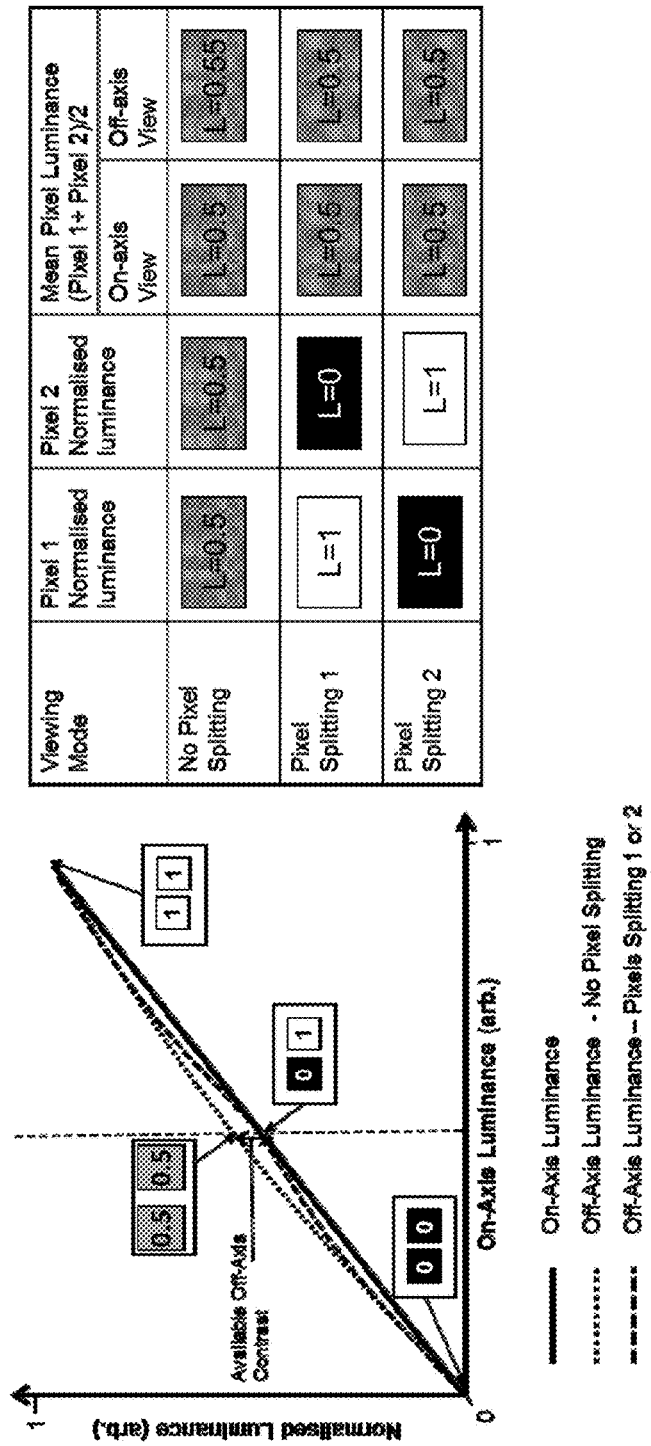
FIG. 3: is a plot of the selectable off-axis to on-axis luminance space of a Fringe Field Switching (FFS) mode display, when using an image processing method of the prior art.

In an exemplary embodiment, the LCD is an FFS type LCD having two pixel types which are alternated on a row-by-row basis in the LC panel, 2. In a modern FFS type display, due to the increasing pixel resolutions now used in typical products such as smartphones and tablets, individual pixels are no longer multi-domained. Previous generations of FFS type displays have utilised pixels comprising two distinct regions with differing pixel electrode geometry. Each pixel would comprise a region in which finger electrodes were aligned at approximately 5° to the liquid crystal alignment direction, and a region with finger electrodes at approximately −5° to the liquid crystal alignment direction. When a voltage is applied between the finger electrodes and the common electrode, the LC director is then rotated in the plane of the LC cell clockwise in one pixel region (domain) and anticlockwise in the other. In this way, the best possible view angle performance is achieved as asymmetries in the on-axis to off-axis luminance response from each pixel domain at different viewing angles are averaged out over the whole pixel, and as a result the normalised off-axis luminance and normalised on-axis luminance are very similar, as shown in FIG. 3.

Figure 4:
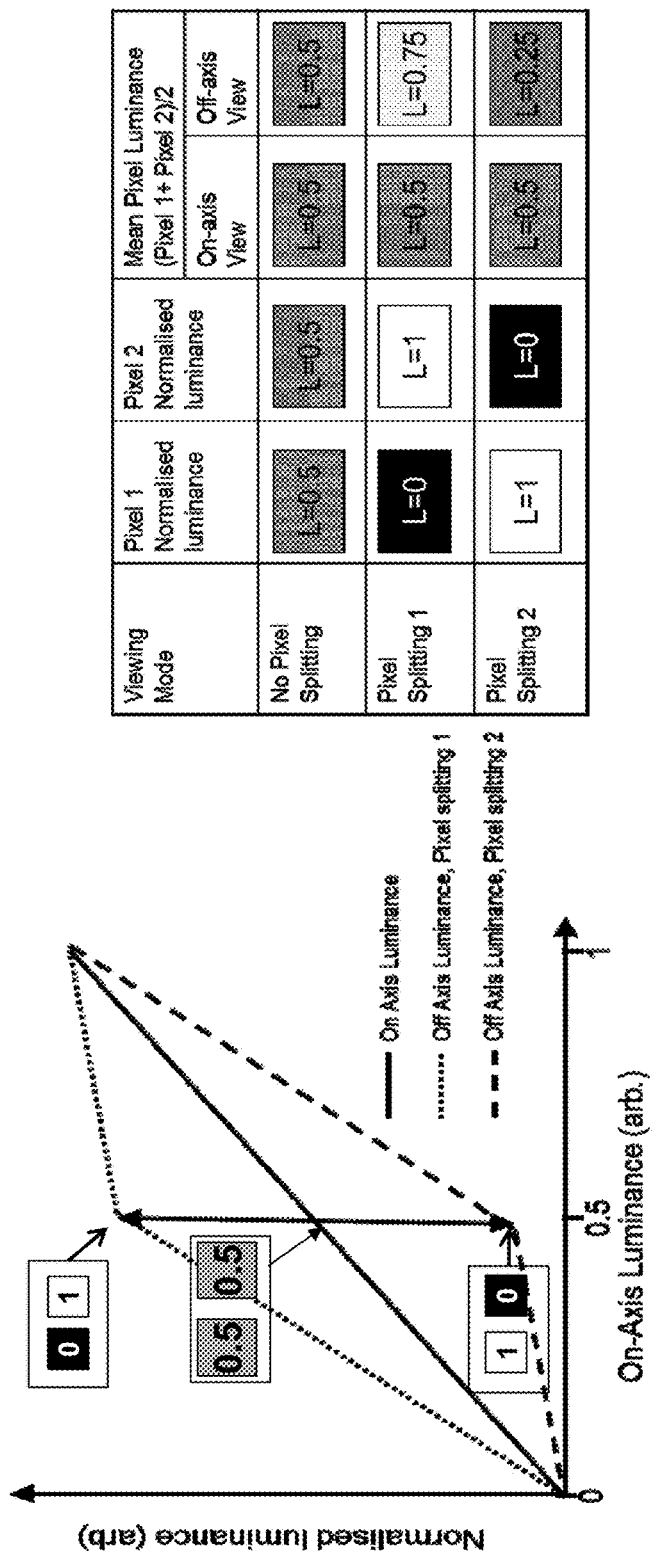
FIG. 4: is a plot of the selectable off-axis to on-axis luminance space producible by a Fringe Field Switching (FFS) mode display, when modified by the addition of a passive optical element such as a lenticular array, when using a further image processing method of the prior art.
Figure 6:
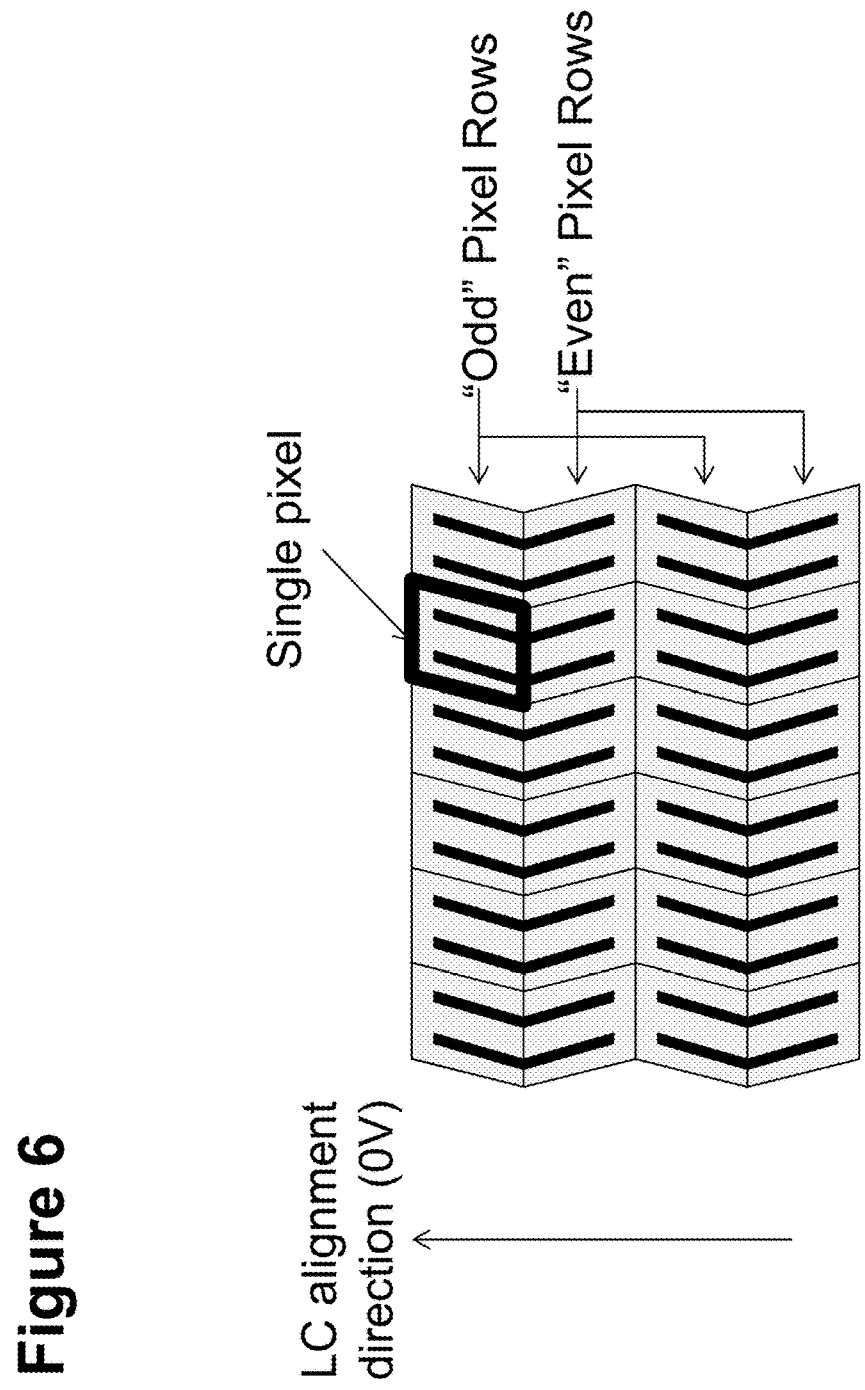
FIG. 6: Is an illustration of the two pixel types occupying alternate rows in an FFS mode display in accordance with an embodiment of the present invention.
Figure 7:
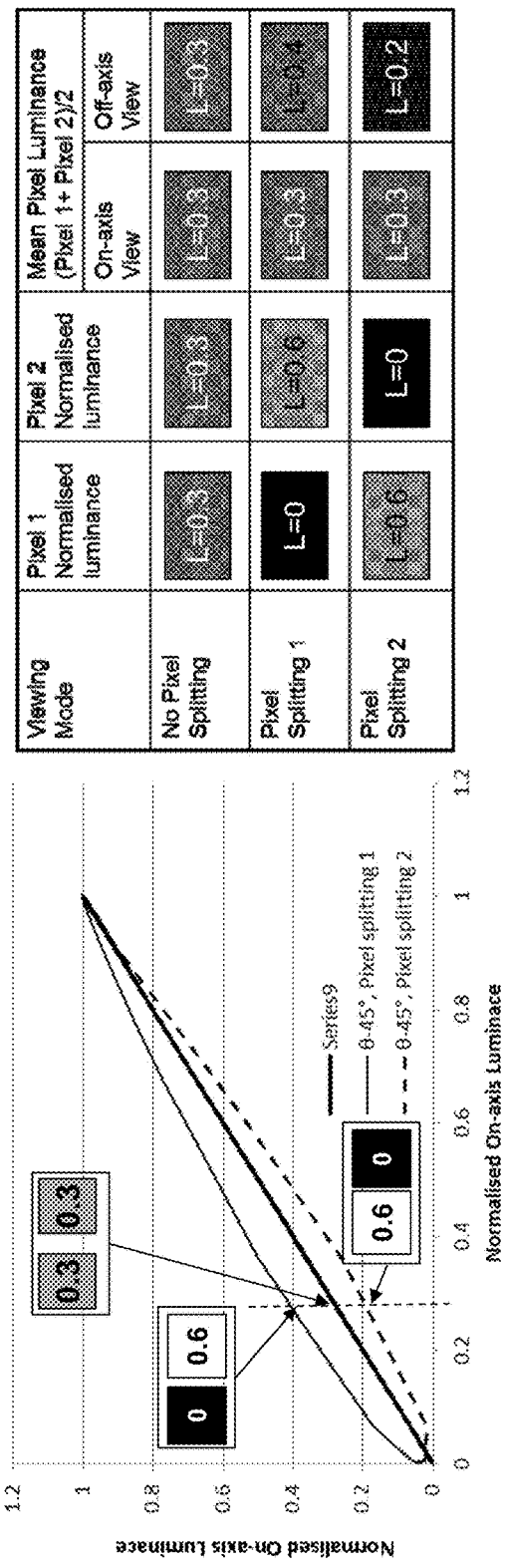
FIG. 7: is a plot of the selectable off-axis to on-axis luminance space of a Fringe Field Switching (FFS) mode display, when using an image processing method of this invention.

In a non-multi-domained display of this embodiment however, each pixel consists of only a single domain, with finger electrode alignment at either + or −5° to the LC alignment direction, and alternate pixel rows consist solely of pixels of one type or the other, as illustrated in FIG. 6. This allows independent electrical control of the two domain types, and averaging of the view angle performance asymmetries can be prevented by addressing only the odd or even pixel rows. The off-axis to on-axis luminance response of the separate odd and even rows of such a display is illustrated in FIG. 7. It can be seen that although the difference between pixel types is not as large as the idealised pixel with different angular viewing performance of FIG. 4, a "pixel splitting" based privacy effect is achievable, with a 2:1 off-axis contrast ratio provided between regions of the display both having a combined on-axis luminance of 30% of the maximum, but having this luminance provided solely by the odd pixel rows (pixel splitting 1) or by the even pixel rows (pixel splitting 2).

In order to implement the switchable privacy effect of this embodiment, the display control electronics 1, are provided with a different LUT for each of the public and private modes. In the pubic mode, the main image data, which is typically provided with 8 bit per pixel accuracy, is input to the LUT which outputs either an analogue signal voltage, or a modified digital output value for conversion to a signal voltage later in the signal pipeline. In either case, the purpose of the LUT is to account for the particular voltage-luminance characteristic of the display to ensure that the input image data results in the relative luminance at each pixel of the display intended by the data.

In the private mode however, the LUT is modified to allow the output voltage or data value to be dependent on both the input main image and the input side image, and to selectively concentrate the combined luminance of a pair of pixels comprising one "odd" and one "even" row pixel into the "odd" row pixel for low side (e.g., false or logic "0)" image pixel values, and into the "even" pixel row for high side (e.g., true or logic "1") image values (or vice versa). It may also be modified to compress the range of luminance values produced by the full range of main image data values, so as to result in output main image luminances which have a larger difference between the off-axis luminances produced by odd rows and even rows, and therefore a stronger privacy effect.

Figure 8:
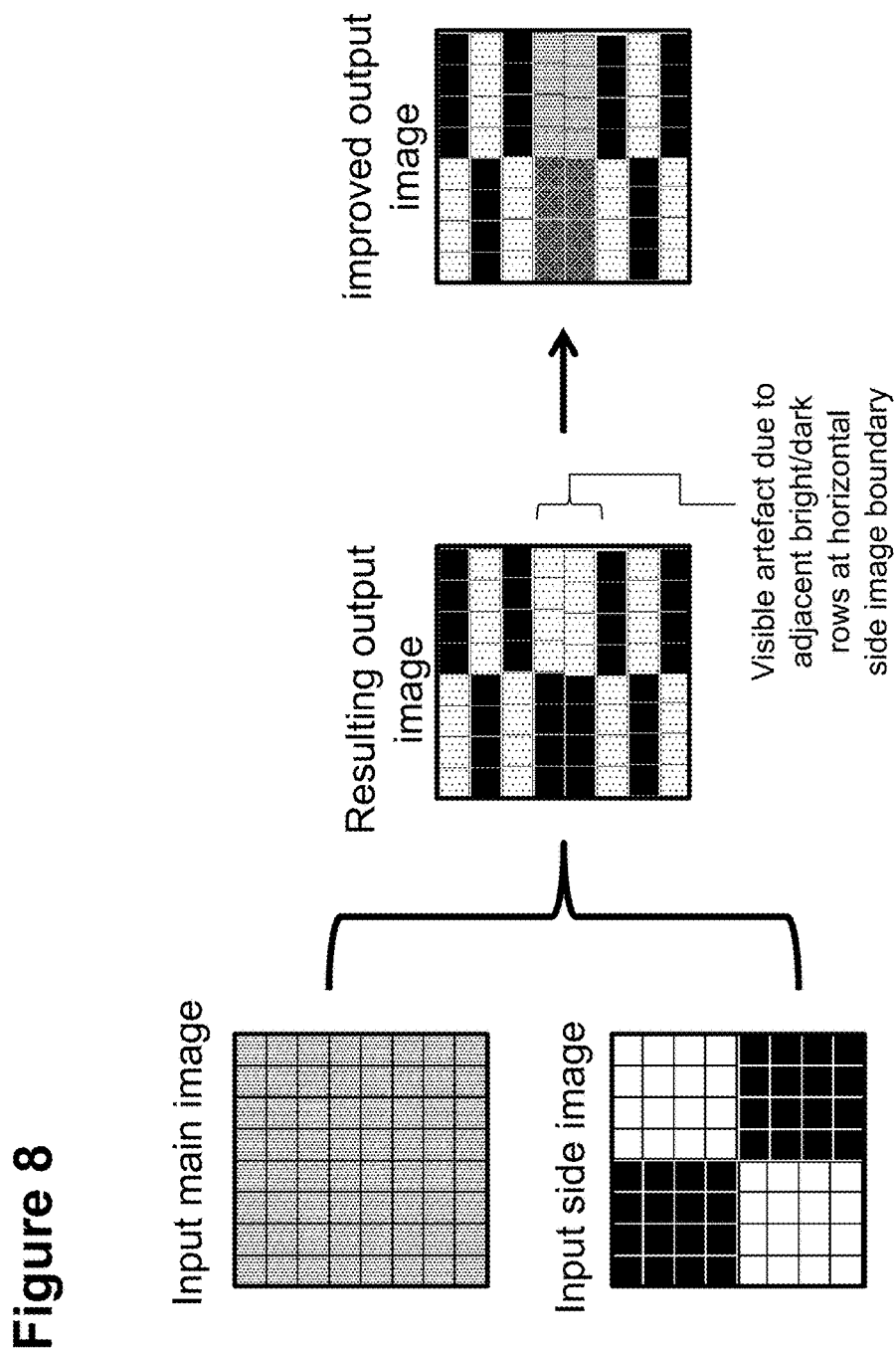
FIG. 8: is an illustration of image artefacts which may be visible to the legitimate on-axis viewer resulting from an image processing method of this invention.

An example of the resultant output image for a region of uniform grey input image, and a corresponding region of black/white chequer side image is given in FIG. 8. It can be seen that output image consists of bright odd rows with dark even rows where the side image is dark, and dark odd rows with bright even rows where the side image is bright. This creates a problem where the side image changes from one row to the next, as a pair of adjacent rows with the same bright or dark state is created, resulting in an artefact visible to the legitimate on-axis viewer. This artefact may be prevented if the image processing method is adjusted to account for the effect. This may be achieved by inputting to the LUT, in addition to the main and side image data for each pixel, and a flag indicating whether the currently processed pixel is for an odd or even row, a second flag to indicate the presence of a horizontal boundary in the side image at the upper or lower edge of the current pixel. With the inclusion of this information, the LUT output values may be modified so that if the output data would produce a dark row (i.e. for even rows with dark side image data, or odd rows with bright side image data), the output data values are scaled up to produce a brighter result (e.g. dark grey rather than black), and likewise where the output data would produce a bright row (i.e. for even rows with bright side image data, or odd rows with dark side image data), the output data values are scaled down to produce a darker result (e.g. light grey rather than white). In this way, the local average resulting luminance for the on-axis viewer can be maintained at a constant value for uniform main image regions, despite the changing side image data, and the side image remains effectively invisible to the legitimate on-axis viewer, 3. The LUT may also be modified to account for any difference in the on-axis luminance produced by an odd-even pixel pair in the "pixel splitting 1" and the "pixel splitting 2" states. As described in this exemplary embodiment, and illustrated in the table of FIG. 7, if two data values are output to a pair of pixels consisting of one of each pixel type, the overall on-axis luminance produced by the pair would be expected to be identical, regardless of which pixel received which data value. This is because the pixels are symmetrically mirrored copies of each other, and share an identical angular arrangement with the LC alignment direction and polariser transmission axes, so their on-axis data value to luminance response ("gamma curve") would be expected to be identical. However small misalignments of the LC alignment and polariser axes may occur in manufacture, and may result in the transmission for a given data value being biased towards one of the two pixel types. The effect may be measured for a given panel or batch of panels and accounted for in the LUT however, so that the two splitting states produce the same overall on-axis luminance for all input main image data values, and the side image remains effectively invisible to the on-axis viewer, 3.

Figure 9:
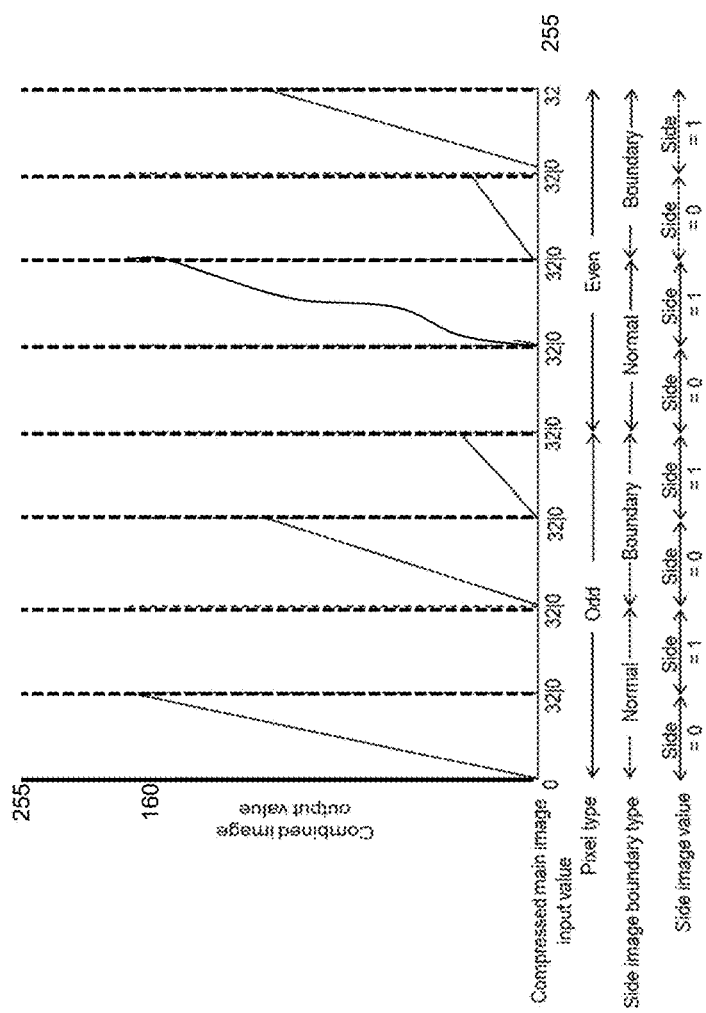
FIG. 9: is an illustration of a LUT as may be utilised in accordance with an embodiment of the present invention, in order to remove the image artefacts of FIG. 8.
Figure 10:
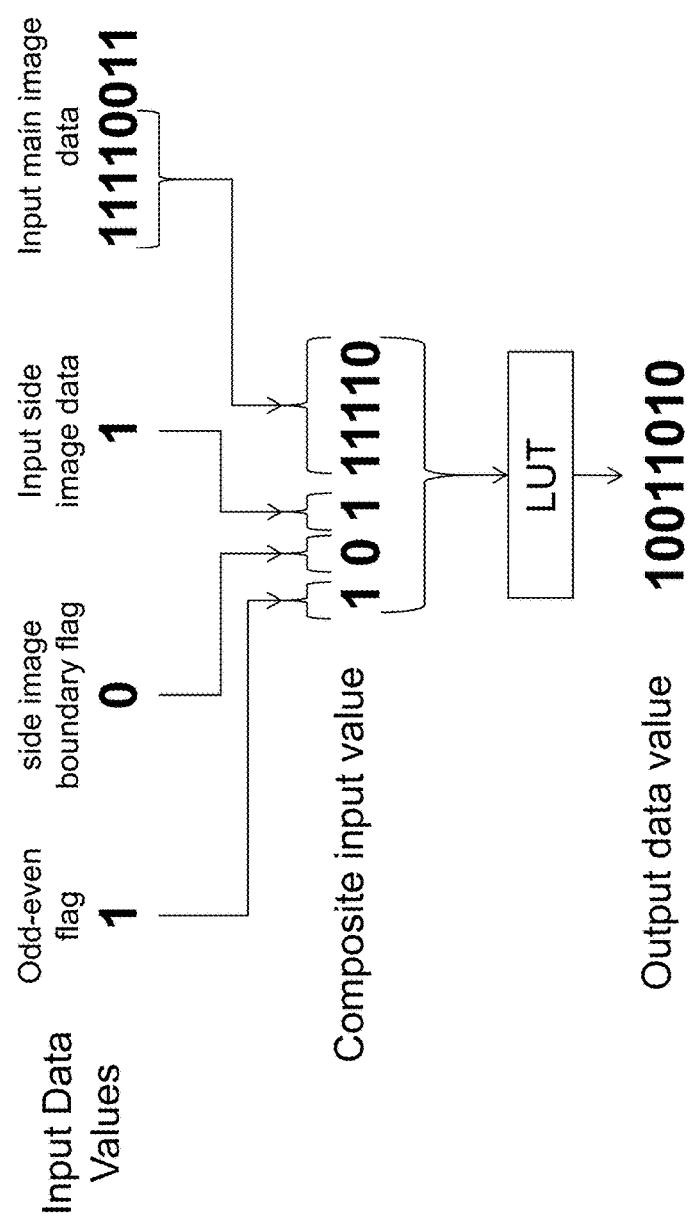
FIG. 10: is a process flow diagram showing an image processing method in accordance with an embodiment of the present invention.

An example LUT as may be used by the process of this embodiment is illustrated in FIG. 9. A composite input value for each pixel may be generated from the "odd-even" flag, the side image boundary flag, the input side image data value, and the most significant five bits of the main image input data value, for each pixel. This composite input value is then input to the LUT of FIG. 9. An illustration of the generation of this composite input value, and subsequent input to the LUT of FIG. 9, is shown in FIG. 10. It can be seen from the example plots of the output data values in the LUT of FIG. 9 that for non-side-image-boundary pixels, all output values for odd rows with a side image value=1, and even rows with a side image value of 0 are zero. This creates the alternating dark-bright pixel row pattern necessary for the privacy effect.

It can also be seen that for the remaining non-side-image-boundary pixels, the output value is scaled to a maximum of 160, in order to effectively compress the main image luminance into the 0-35% range (assuming a display gamma value of 2.2) so as to ensure an adequate privacy effect.

It can also be seen that for side image boundary pixels which would be bright (odd and side =0, or even and side=1) output values are scaled to a further reduced range (typically 75% of the luminance of the maximum main image luminance) to account for two bright rows being adjacent in this case.

It can also be seen that for side image boundary pixels which would be black (odd and side=1, or even and side=0) output values are scaled to an even further reduced range (typically 25% of the luminance of the maximum main image luminance) to account for two dark rows being adjacent in this case.

It can also be seen that for one of the two bright non-side-image-boundary pixel ranges (even and side=1 in this example), the scaled output values are also adjusted relative to the other bright non-side-image-boundary pixel range (odd and side=0 in this example) so as to ensure equal overall brightness for regions having the same main image input data value, but opposite side image data value.

These methods as described herein may be straightforwardly modified to achieve the same effect via different methods. For example, the order in which the input data values are combined into the composite input data value may be rearranged, with commensurate rearrangement of the output values in the various ranges of the LUT corresponding to the different combinations of these without affecting the resulting output data value. Also, to avoid the reduction of bit-depth of the main image from 8 to 5 bits per pixel, an expanded LUT with greater than 8 bit input resolution may be used. While 5 bits per pixel main image quality has been found adequate for the reduced luminance range the main image occupies after compression, to avoid the consequent display brightness reduction this entails, the display system may increase the brightness of the backlight to compensate at least partially, in which case greater than 5 bit per pixel main image data may be desirable. Additionally, while 1 bit per pixel side image data has been found to be adequate for typical FFS displays, due to the limited range of off-axis luminance outputs, and the fact that the off-axis to on-axis luminance curves of FIG. 7 are swapped at the opposite off-axis viewing azimuth, so the side image appears inverted, it may be desirable when applying the methods of this invention to displays with off-axis to on-axis luminance characteristics differing to those of FIG. 7 to utilise a side image with increased bit depth.

While the methods described herein are applied to all pixels in the display identically, in a colour display, the methods may be applied to each colour channel independently, with for example the red sub-pixel of each pixel being processed using the red sub-pixel data from the corresponding pixel in both the main and side image, and a side image boundary flag being input or calculated based on changes in each of the separate colour channels of the side image. Also a different LUT may be used for each colour channel to account for different degrees of mismatch in the luminance produced by odd and even pixels of different colours. Separate LUTs may also be used in order to reduce the visibility of certain colours in the boundary region. In particular, the approach previously disclosed in FIG. 8 has a different balancing effect depending on the two side image regions between which the data is transitioning, and it may be desirable to have a separate scaling for each possible transition. In this way the visibility of the side image pattern to the on-axis viewer 3 is further reduced, resulting in an improvement in overall image quality.

Also, while the preferred embodiments has been described as being applicable to an FFS type LCD with monodomain pixels, the method may be applicable to any display having pixels of at least two types with different viewable properties, including conventional displays having pixels of only one type, which may be modified by the use of some passive optical element that alters the viewing angle properties of some pixels differently to others, effectively creating the required two pixel types. It is also the case that that the standard FFS type LCD with monodomain pixels is conventionally used with linear polarisers oriented with their transmission axes either horizontally or vertically to the normal display viewing orientation. This results in the two pixel types having near identical viewing angle performance in the horizontal and vertical off-axis azimuths, and therefore little or no privacy effect in these directions. This may be altered by rotating the polariser orientation, along with the LC zero volt alignment direction and pixel electrode finger geometry by e.g., 45 deg, to rotate the weak privacy azimuths to the less critical diagonal quadrant azimuths. Alternatively, modifications could be made to the optical film arrangement typically used with an FFS display to allow the use of circular polarisers, in order to obtain an improved privacy effect, generally, and in the horizontal and vertical viewing direction particularly.

Additionally, while the example above describes the output values for only one of the two bright non-side image boundary pixel ranges being adjusted relative to the other, both ranges may have some degree of adjustment applied, and the scaled ranges for pixel in a side image boundary region may also have their output values adjusted for improved matching of the on-axis luminance of different side image and boundary/non-boundary regions.

Also, while the generation of a composite input data value and use of a LUT are given here as a particularly simple means of achieving the data conversion which results in the intended privacy effect, other methods of performing the calculation, either in the display control electronics, or in software prior to inputting the image data to the display control electronics may be possible.

Another method for using a LUT with certain sectors assigned to different flag states, involves removing some of the redundancy associated with the previously disclosed method. In particular, in the previous method there are repeated sectors, such as the off-state present in either odd rows with high side image or even rows with low side image. Also repeated are the boundary cases. If in addition only one type of boundary is found in the side image, such as the boundary type which goes from 0% to 75% of normal brightness (the two cases, where the boundary flag is on and either it is an odd row with low side image or it is an even row with high side image), and these two cases are allowed to occupy the same sector of the LUT, then there are now only 4 possible sectors. These are the two sectors corresponding to normal, on, mode (odd, side low, and even, side high), the sector corresponding to off mode (either even, side low, or odd, side high), and the sector corresponding to the boundary state. Therefore, these four sectors can be indicated by two flag bits, which means that 6 bits of the original input image can be shown, thus improving the image quality. It can be seen that there are trade-offs to be made here: in particular in this case, the side image must be chosen to only transition in certain rows, and the ability for accurate colour calibration in the boundary regions is reduced. There are, of course, many other ways of generating the LUT, all with different strengths and weaknesses.

In a further LUT implementation, it may be desirable to introduce a privacy effect even when the input main image data is at 0% brightness. For these pixels, while there may be some privacy natively present due to the different layers within the LCD, it is possible to increase or introduce privacy, by setting the minimum used brightness for "on" pixels at, for example, 10%. In this way, a higher privacy strength is achieved for all possible pixel data values. One problem with this approach, is a reduced contrast visible to the on-axis viewer 3. It may be desirable to present the display user or owner a choice of minimum and maximum brightness levels, so that a suitable compromise between visibility, contrast, and privacy strength can be selected.

In addition, it may be desirable to implement a blurring filter, in order to reduce the visibility of artefacts created by the privacy process. For example, a one-pixel thick horizontal line will normally either be shown at twice its intended brightness if it is in the correct combination of even/odd row and side image states, or completely dark if it is in the wrong combination. In a similar situation, it may be that the line is initially rendered but then the side image changes and the line disappears. To overcome this, different vertical blur filters may be used, and the system displaying content on the LCD may adjust the image data in other ways, such as by changing the fonts used to display text so that the vertical thickness of text will always be a multiple of two pixels.

INDUSTRIAL APPLICABILITY

The embodiments of this invention are applicable to many display devices, and a user may benefit from the option of a privacy function on their normally wide-view display for use in certain public situations where privacy is desirable. Examples of such devices include mobile phones, Personal Digital Assistants (PDAs), tablet and laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

What is claimed is:

1. A method of processing image data for a display having a plurality of pixels, comprising:
    obtaining main image data corresponding to a main image;
    obtaining side image data corresponding to a side image;
    processing, using control electronics, the main image data and the side image data to produce combined image data, wherein said processing includes at least one of
    i) processing the main and side image data as a function of an off-axis to on-axis luminance response of each type of pixel on the display, wherein the off-axis to on-axis luminance response of a first type of pixel is different from the off-axis to on-axis luminance response of a second type of pixel, or
    ii) determining whether each pixel is adjacent to a boundary in the side image, and processing the main and side image data as a function of whether each pixel is adjacent to a boundary in the side image, wherein the boundary indicates a spatial change of brightness in the side image.

2. The method according to claim 1, wherein said processing includes processing the main and side image data using both steps i) and ii).

3. The method according to claim 1, wherein processing the main and side image data as a function of a pixel type includes determining the pixel type as a function of a location of each pixel on the display.

4. The method according to claim 1, further comprising outputting the processed image data on the display, wherein an on-axis viewer perceives from the combined image the main image and an off-axis viewer perceives from the combined image the side image.

5. The method according to claim 1, further comprising using a first look-up table to process the main image data when in a public display mode, and using a second look-up table to process the main and side image data when in a private display mode, the second look-up table different from the first look-up table.

6. The method according to claim 5, wherein using the first or second look-up table includes using a look-up table that takes into account a voltage-luminance characteristic of the display to provide an intended luminance at each pixel as defined by at least one of the main image data or the side image data.

7. The method according to claim 5, wherein using the second look-up table includes using a look-up table that is dependent on both the main image and the side image.

8. The method according to claim 5, wherein using the second look-up table includes using a look-up table that selectively concentrates a combined luminance of a plurality of pixels including at least two pixel types into one pixel type, wherein the pixel type to be used is based on the side image data.

9. The method according to claim 5, wherein using the second look-up table includes using a look-up table that compresses a range of luminance values produced by the main image data to produce luminances that have a larger difference between off-axis luminances produced by odd rows and even rows.

10. The method according to claim 1, further comprising generating a composite input value for each pixel for entering into at least one of the first or second look-up table to retrieve the output data value.

11. The method according to claim 10, further comprising selecting the most significant bits of the main input image data, and combining the most significant bits with the composite input data value.

12. The method according to claim 1, further comprising applying a filter to the main image data, which has the effect of selectively blurring or widening fine features in that image, prior to combining the main image data with the side image data to reduce image artefacts.

13. The method according to claim 1, further comprising using a fringe-field switching-type (FFS-type) liquid crystal display (LCD) to display a combined image corresponding to the combined image data.

14. The method according to claim 13, wherein using the FFS-type LCD includes using an FFS-type LCD that does not include additional optical components for modifying the display to enable a private mode.

15. The method according to claim 13, wherein using the FFS-type LCD includes using an LCD in which the at least two types of pixels are pixels in alternate rows having a mirrored electrode geometry to each other.

16. A method for generating pixel data for a display having a plurality of pixels for providing a private viewing mode with a main image and a side image, the display including pairs of pixels each pair comprising a first pixel type having a first off-axis to on-axis luminance response and a second pixel type having a second off-axis to on-axis luminance response, wherein the first off-axis to on-axis luminance response of the first type of pixel is different from the second off-axis to on-axis luminance response of the second type of pixel, the method comprising:

determining an on-axis data value to luminance response for the first pixel type of a pair of pixels;

determining an on-axis data value to luminance response for the second pixel type of the pair of pixels; and generating, via control electronics for the display, a first data value for one pixel of the pair, and generating a second data value for the other pixel of the pair, wherein generation includes generating the respective data values to compensate for a variation of the on-axis data value to luminance response for the respective pixels of the pair of pixels.

17. A method for generating pixel data for a display for providing a private viewing mode with a main image and a side image, the display having a plurality of pixels, the method comprising:

using a lookup table (LUT) to generate an output value for each pixel of the display, wherein using the LUT includes determining, using control electronics, the output value for each pixel which corresponds to an input value for a pixel that is adjacent to a boundary in the side image; and upon determining the output value for each which pixel corresponds to an input value for a pixel that is adjacent to the boundary in the side image, scaling, via the control electronics, the output value relative to an equivalent output value for non-side image boundary pixels, said scaling configured to account for an appearance in an output image of adjacent pixels having a same modification direction relative to input main image data.

18. A display device, comprising:

a display having a plurality of pixels; and control electronics operatively coupled to the display, the control electronics configured to execute the steps according to claim 1.

19. The display device according to claim 18, wherein the display comprises a fringe-field switching (FFS) type liquid crystal display (LCD) with at least two types of pixels arranged in alternate rows and having a mirrored electrode geometry to each other.

20. The display device according to claim 18, wherein the display comprises a fringe-field switching (FFS) liquid crystal display (LCD) having monodomain pixel types with pixel electrode fingers, and an orientation of each pixel electrode finger is mirrored in alternate rows.

* * * * *